United States Patent [19]

Suzuki et al.

[11] 4,234,917
[45] Nov. 18, 1980

[54] COMMUTATION FAILURE DETECTION AND RESTORATION FOR SCR FREQUENCY CONVERTERS

[75] Inventors: Yoshiaki Suzuki; Junichi Nakakuki; Takumi Mizukawa; Yoshio Ogino, all of Kadoma, Japan

[73] Assignee: Matsushita Electric Industrial Co., Ltd., Osaka, Japan

[21] Appl. No.: 6,114

[22] Filed: Jan. 24, 1979

[30] Foreign Application Priority Data

Jan. 25, 1978 [JP] Japan ................... 53-7746

[51] Int. Cl.³ .............................. H05B 5/04
[52] U.S. Cl. .................... 363/160; 363/54; 363/57; 219/10.77
[58] Field of Search ................... 363/52–54, 363/57, 128, 160–162; 307/252 T, 252 UA, 252 M; 219/10.75, 10.77, 10.55 B; 323/24, 22 SC

[56] References Cited

U.S. PATENT DOCUMENTS

| | | | |
|---|---|---|---|
| 3,821,509 | 6/1974 | Amagami et al. | 219/10.77 |
| 3,916,287 | 10/1975 | Brenneisen et al. | 363/57 |
| 3,947,748 | 3/1976 | Klein | 363/57 |
| 4,074,101 | 2/1978 | Kiuchi et al. | 363/160 X |
| 4,092,509 | 5/1978 | Mitchell | 363/160 X |

Primary Examiner—J. D. Miller
Assistant Examiner—Peter S. Wong
Attorney, Agent, or Firm—Lowe, King, Price & Becker

[57] ABSTRACT

A frequency converter having a silicon controlled rectifier comprises a protection circuit which includes a series resonant circuit connected in parallel with the silicon controlled rectifier to generate a reverse voltage thereacross in response to a short circuit established in response to a commutation failure of the silicon controlled rectifier. An inhibit circuit is provided to respond to the reverse voltage by inhibiting the current flow through the silicon controlled rectifier to allow the same to restore to its locking state.

7 Claims, 7 Drawing Figures

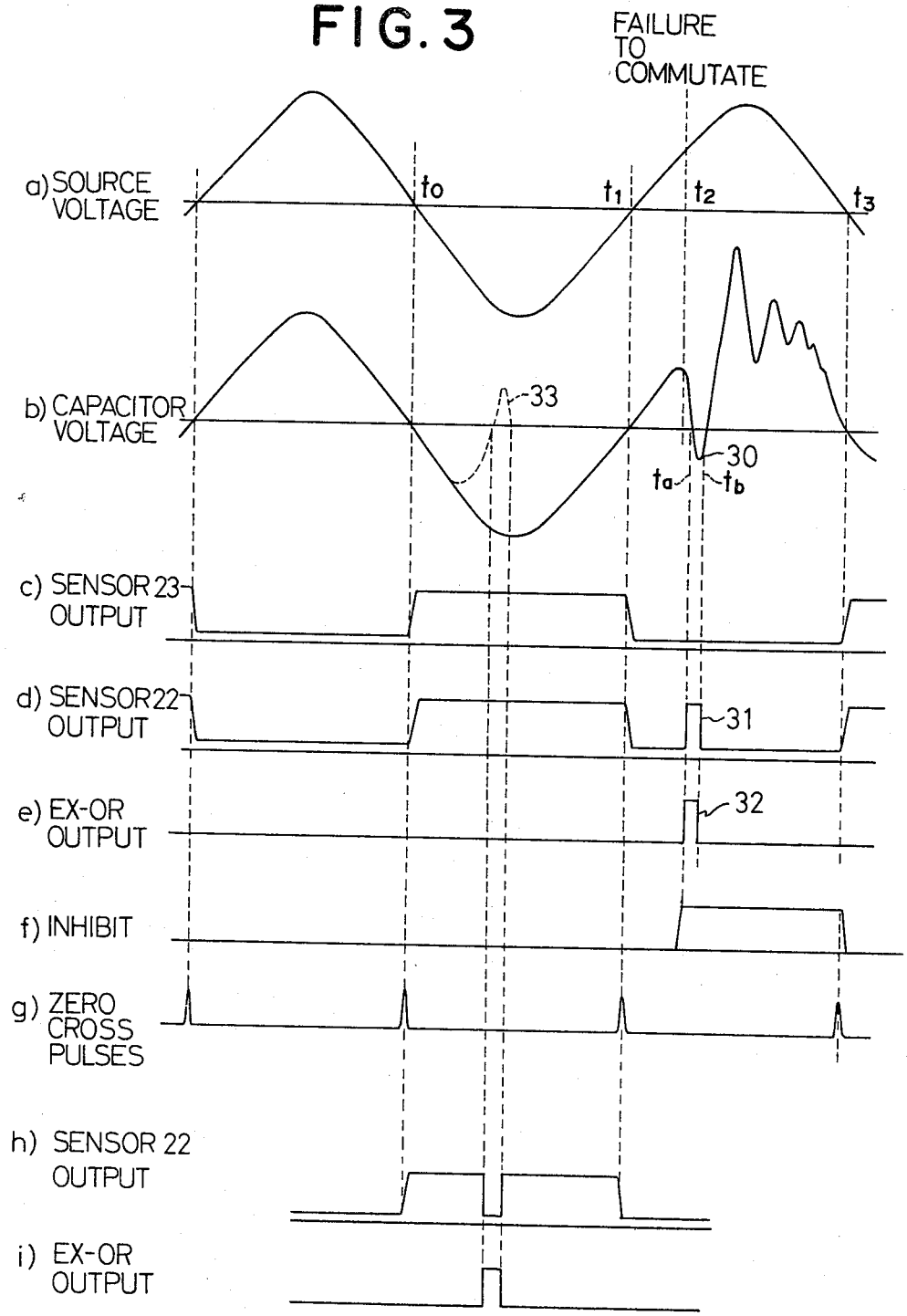

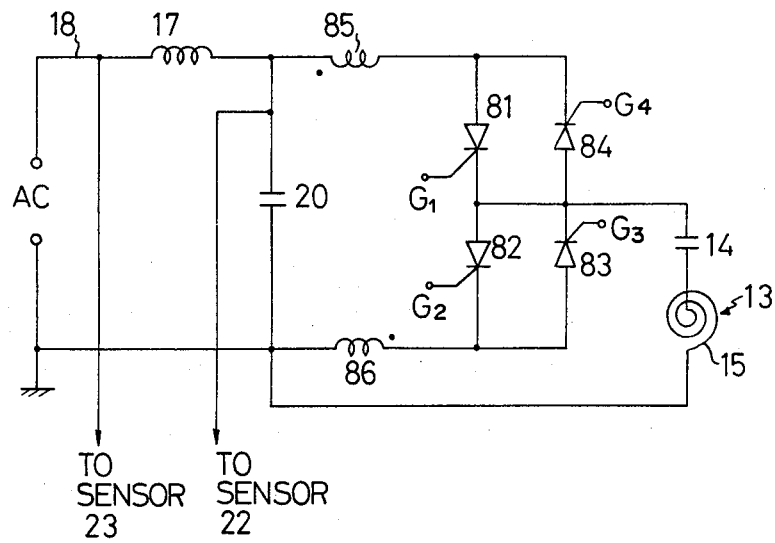
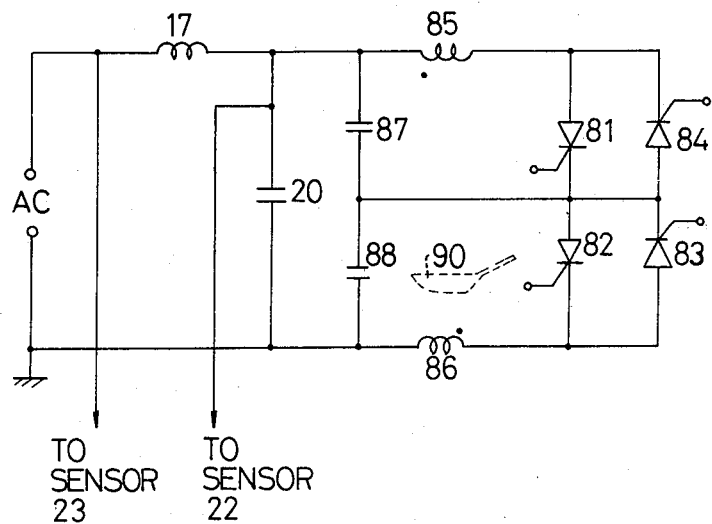

COMMUTATION FAILURE DETECTION AND RESTORATION FOR SCR FREQUENCY CONVERTERS

BACKGROUND OF THE INVENTION

The present invention relates generally to frequency converters and more particularly to thyristor frequency converters including protection means responsive to a commutation failure of the thyristor.

Frequency conversion systems generally employ silicon controlled rectifiers, hereinafter referred to as SCR's. In these frequency converters, commutation of the SCR is provided during each cycle by energy storage in capacitor or inductor. If for any reason the SCR should fail to commutate, the usual consequence is a short circuit across the low frequency power lines. To prevent damage of the SCR and other related circuitry, fast-acting fuses and circuit breakers are commonly employed to open the short circuit.

The requirement for high reliability and maintenance-free frequency converters has forced engineers to select energy storage elements with large safety margins to assure that commutation occurs reliably even during transients in load impedance. This requirement for large commutation safety margins has tended to limit the use of SCR frequency converters in such applications as high frequency induction heating where the load impedance is erratic or undefined, reliability without maintenance is essential, or where economic factors prevent use of large safety margins in selecting commutating energy storage elements.

U.S. Pat. No. 3,821,630 discloses a protection circuit for an SCR converter in which the instantaneos voltage across the SCR is sensed and compared with a threshold voltage to inhibit the current flow through the SCR when the instantaneous voltage across the SCR is less than the threshold voltage. The converter includes a transistor chopper circuit which is responsive to gating signals to periodically interrupt the current flow through the SCR. During the inhibit period the chopper circuit is also inhibited to allow the SCR to restore to its blocking state.

However, the transistor chopper circuit should be of a relatively heavy duty type to allow sufficient magnitude of current to flow through the SCR, and if the frequency converter is designed to operate as an induction heating system the chopper circuit would have to carry a large value of current, which would affect the reliability and economy of the system.

SUMMARY OF THE INVENTION

The present invention contemplates the use of a second series resonant circuit connected in parallel with an SCR with which the first series resonant circuit is connected in parallel to generate current flow in the SCR in response to gating signals. The second series resonant circuit is tuned to a frequency lower than the frequency of the first resonant circuit but higher than the frequency of input source voltage. Upon the occurrence of a commutation failure, the second series resonant circuit generates a reverse voltage across the SCR, and simultaneously the gating signal are inhibited to allow the SCR to restore to its blocking state. The inhibit period continues until the occurrence of a zero crossing point of the next half cycle of the low frequency voltage source. The present invention eliminates the use of a chopper circuit to allow the frequency converter to deliver a high power high-frequency energy to a load. The protective circuit of the invention is particularly advantageous for frequency converters of a relatively large power rating, such as multiple loadings.

The primary object of the invention is therefore to provide a novel protection circuit which promptly detects the occurrence of a commutation failure of an SCR frequency converter of relatively high power ratings.

BRIEF DESCRIPTION OF THE DRAWINGS

The invention will be further described by way of example in conjunction with the accompanying drawings, in which:

FIG. 3 illustrates typical waveforms associated with the operation of the frequency converter of FIG. 1;

FIGS. 4-6 are modifications of the frequency converter of FIG. 1; and

DETAILED DESCRIPTION

Figure 1:
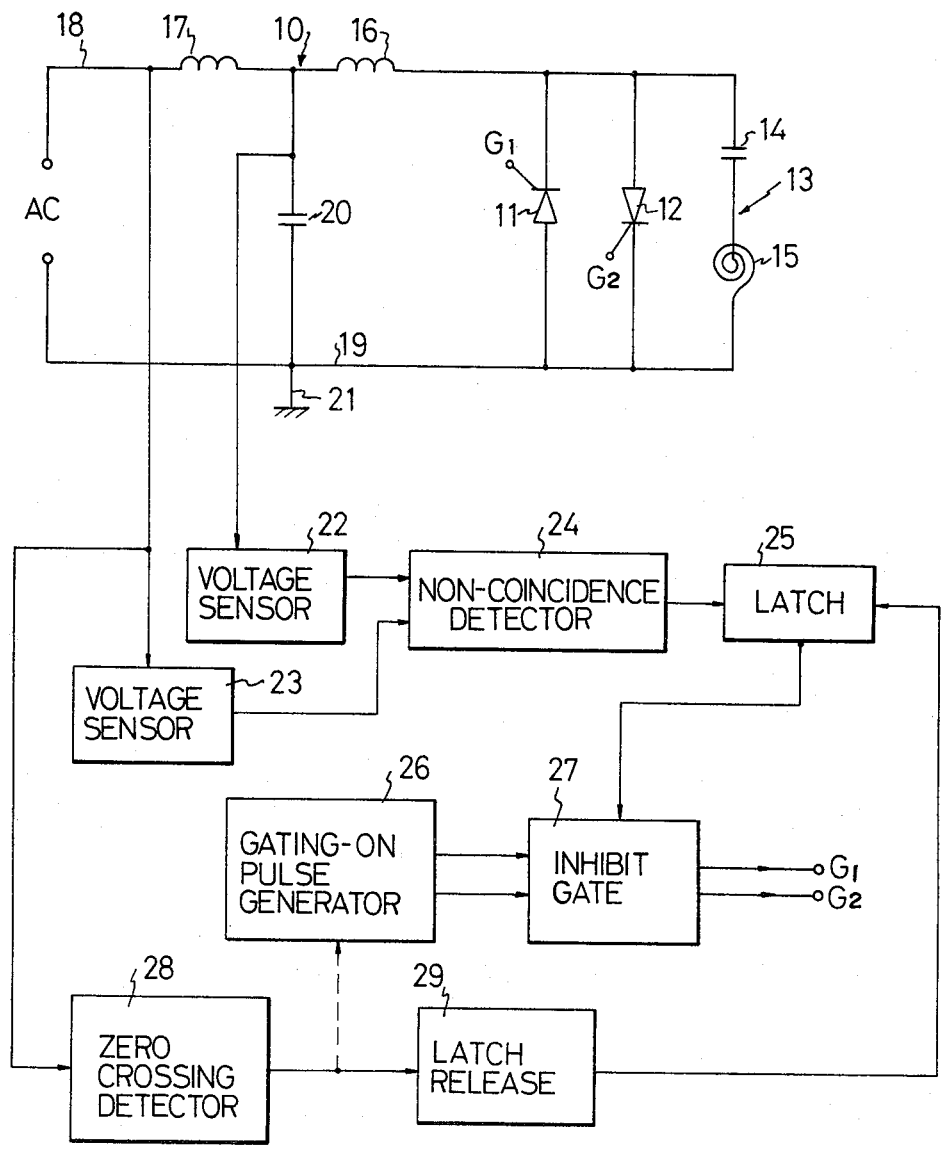
FIG. 1 is a schematic block diagram of a frequency converter embodying the protection control circuit of the invention.

FIG. 1 illustrates a two SCR frequency converter 10 comprising SCR's 11 and 12 which are connected in an inverse parallel circuit. The SCR's 11 and 12 are connected to a commutating circuit 13 including a commutating capacitor 14 and an induction heating work coil 15. This commutation circuit forms a series resonant circuit with the SCR's 11 and 12 when they alternately conducts in response to trigger pulses applied to their gates G1 and G2 and is tuned to a frequency in the range between 17 to 20 kHz. The trigger pulses are generated in a trigger pulse generator 26 through an inhibit gate 27.

The frequency converter 11 is powered from an AC voltage source through a series connection of inductors 16, 17 interposed in a power circuit 18. A capacitor 20 is connected across the junction of inductors 16, 17 and a power line 19 which is grounded as at 21. This capacitor forms a series resonant circuit with the inductor 16 when each SCR is conducting, which resonant circuit is tuned to a frequency lower than the natural resonant frequency of the commutating circuit, but higher than the low frequency of the AC source, a preferred valve being 5 kHz. As will be described later, the series resonant circuit of capacitor 20 and inductor 16 does not affect the commutation of the SCR's 11 and 12 when each SCR is permitted to restore its blocking state during its inherent turn-off time. If for any reason the SCR 11 and 12 fails to commutate within the turn-off time so that the conductor state continues, the capacitor 20 will be discharged through the conducting SCR and through the inductor 16, developing a voltage which is reverse in polarity to the polarity of the input AC voltage at that instant. The inductor 17 acts as an RF choke to suppress the high frequency signal to avoid radio interference and to isolate the capacitor 20 from the input source voltage.

In order to detect the occurrence of a commutation failure, voltage sensors 22 and 23 and a non-coincidence detector 24 are provided. The voltage sensor 22 is connected from the capacitor 20 to sense the voltage developed thereacross with respect to ground and the voltage sensor 23 is connected from the power line 18 to sense the instantaneous value of the source voltage with respect to ground. These voltage sensors operate as a threshold switch to provide high and low voltage outputs, respectively, in response to the high and low input voltages. The outputs from the voltage sensors 22 and 23 are connected to inputs of the non-coincidence detector 24 such as Exclusive-OR gate.

The operation of the converter circuit of FIG. 1 is best described in conjunction with the waveforms of FIG. 3. FIG. 3a illustrates the input source voltage at the power line 18 and FIG. 3b illustrates the voltage across the capacitor 20. During the positive half cycle of these voltages, the voltage sensors 22 and 23 generate low voltage outputs and during the negative half cycle they generate high voltage outputs as illustrated in FIGS. 3c and 3d. If it is assumed that, during a positive half cycle from time $t_1$ to $t_3$, the SCR 12 has failed to commutate at time $t_2$, that is failed to restore to its blocking state, a current will be generated which oscillates through capacitor 20, inductor 16 and through the conducting SCR 12 at a frequency 5 kHz so that capacitor 20 is reversely charged during time interval $t_a$ to $t_b$ to develop a negative voltage 30. The voltage sensor 22 detects this negative voltage and generates a positive pulse 31 which permits the non-coincidence detector 24 to deliver an output pulse 32, FIG. 3e. The output pulse is applied to a latching circuit 25 and thence to the inhibit gate 27 to prevent the trigger pulses being applied to the control gates of thyristors 11 and 12. With the trigger pulses being inhibited, the SCR 12 is reversely biased by the voltage pulse 30 and restores to its blocking state. The inhibit signal from the latch 25 continues until at time $t_3$ when the source voltage is at zero at the beginning of the next half cycle.

If SCR 11 is assumed to have failed to commutate during the negative half cycle from time $t_0$ to $t_1$, a positive peak 33 will occur and as a result the output of the voltage sensor 22 drops to the low voltage level as indicated in FIG. 3h. Since the output of voltage sensor 23 is high, a non-coincidence output pulse is developed, FIG. 3i, to inhibit the trigger pulses supplied to SCR 11. The SCR 11 is turned off by the reverse voltage 33.

Automatic resumption of firing operations is effected by means of a zero crossing detector 28 which senses the zero crossing point of the input source voltage and applies a pulse, FIG. 3g, to a latch release circuit 29 which provides a ground potential to the latch circuit 25, whereby the latter is released to terminate the inhibit pulse.

Figure 2:
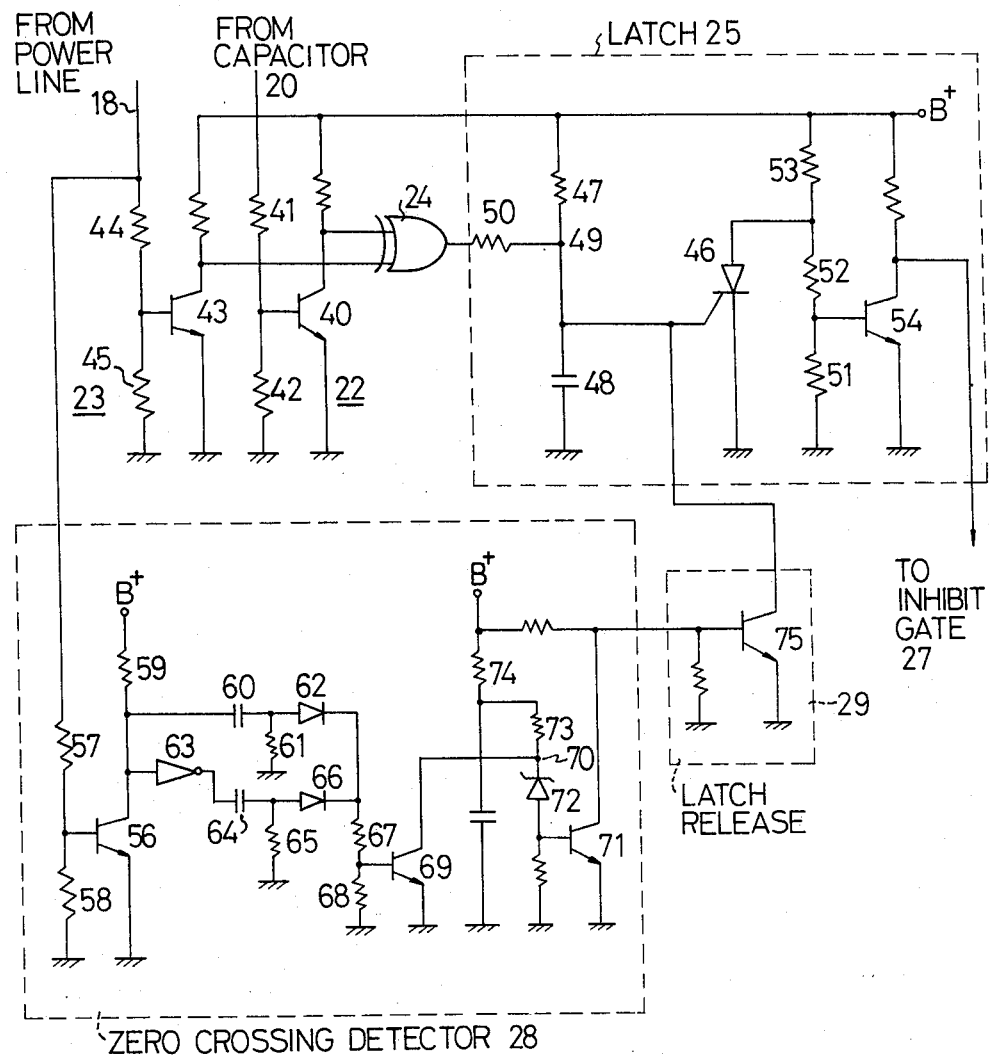
FIG. 2 is an illustration of details of the protection circuit of FIG. 1.

FIG. 2 is an illustration of a detailed circuitry of the frequency converter of FIG. 1. The voltage sensor 22 is comprised of a switching transistor 40 having its base connected to a junction between resistors 41, 42 connected in series between capacitor 20 and the ground and its collector-emitter path connected between voltage supply B+ and ground. When the potential at the junction of the resistors is above a threshold level, the transistor 40 is switched on to couple a low or ground potential to an input of the Exclusive-OR gate 24. The voltage sensor 23 comprises a switching transistor 43, voltage dividing resistors 44 and 45, all of which are connected in a configuration similar to that of sensor 22, with the exception that the resistors 44 and 45 are connected from the power line 18. The switching transistor 43 conducts when the source voltage is above the zero level potential to apply a low level output to another input of the Exclusive-OR gate 24.

The latching circuit 25 includes an SCR 46 having its control gate connected to a junction 49 between a resistor 47 and a capacitor 48 connected in series between voltage supply and ground. The junction 49 is connected to the output of Exclusive-OR gate 24 through a resistor 50. The resistor 50 forms a differentiating circuit with the capacitor 48 so that in response to the leading edge of the output pulse from the Exclusive-OR gate 24, a trigger pulse is delivered from the capacitor 48 to the control gate of SCR 46 to switch it into an ON state, causing a voltage drop at a junction between resistors 51, 52 and 53 connected between voltage supply and ground. A transistor 54, whose base is connected to the junction of resistors 51, 52, is turned off to apply a high level voltage from its collector to the control gate of the inhibit gate 27.

The zero crossing detector 28 is shown as comprising a switching transistor 56 with its base connected to a junction between resistors 57 and 58 connected in series between the power line 18 and ground, the collector being connected through a resistor 59 to the voltage supply and the emitter being connected to ground. This switching transistor is turned on when the power source potential at the power line 18 is positive with respect to the line 19. Therefore, the potential at the collector of transistor 56 is a positive square wave pulse during the negative half cycle of the source voltage, and a negative square wave pulse during the positive half cycle. The positive pulse is then differentiated by a circuit including capacitor 60 and resistor 61 and applied to a diode 62 to produce an output in response to the leading edge of the input positive pulse. An inverter 63 is connected to the collector of transistor 56 to produce a square wave pulse of the opposite polarity to that of the input pulse to produce positive polarity square wave pulse during the positive half cycle of the source voltage. The inverter's output is differentiated by resistor 64 and 65 and applied to a diode 66 to generate an output in response to the trailing edge of the square wave output at the collector of transistor 56. Therefore, the outputs of the diodes 62 and 66 thus occur respectively at the beginning of each half wave cycle of the source voltage, and applied through a voltage divider resistor network formed by resistors 67, 68 to the base of a transistor 69 whose collector-emitter path is connected from a circuit point 70 to ground. A second switching transistor 71, connected to the voltage supply through a Zener diode 72, the circuit point 70, resistors 73 and 74, is to reverse the polarity of the voltage at the collector of transistor 69 to provide a positive polarity pulse in response to the outputs from the diodes 62 and 66.

The collector of transistor 71 is connected to the base of a transistor 75 of the latch release circuit 29, of which the collector is connected to the control gate of SCR 46 of the latching circuit 25 and the emitter is connected to ground. In response to the potential being at high level at the collector of transistor 71, transistor 75 is switched into an ON state to establish a short-circuit between the control gate of SCR 46 and its cathode terminal which is connected to ground. The SCR 46 of the latching circuit 25 is thus restored to its blocking state in response to the beginning of the next half wave cycle of the source voltage.

The protective circuit of the present invention could also be equally used in conjunction with frequency converters of different SCR configurations as illustrated in FIGS. 4 and 5. In FIG. 4, the converter comprises a first circuit leg connected across the power lines 18 and 19 including series-connected, equally poled SCR's 81 and 82 and a second circuit leg in parallel with first circuit leg including series-connected SCR's 83 and 84 which are poled in the opposite sense to the SCR's 81 and 82, the junction between SCR's 81 and 82 being connected to a junction between SCR's 83 and 84. The SCR circuits are connected in series with an inductor 85 in the power line 18 and with an inductor 86 in the power line 19. These SCR's are fired in a sequence; for example, during the positive half cycle of the source voltage, SCR 81 is first gated on by trigger pulse applied to its gate G1 to allow a current to flow through the commutating circuit 13 to the power line 19, and in succession SCR 82 is gated on in response to the next trigger pulse applied to its gate G2 to permit the capacitor 14 to discharge through SCR 82 and inductor 86 and work coil 15. This applies a reverse voltage to the SCR 81 to turn it off. The next trigger pulse is applied to gate G3 of SCR 83 to allow capacitor 14 to discharge in the opposite direction through work coil 15, inductor 86 and through the now conducting SCR 83. This current will continue to flow through SCR 84 when the latter is gated on in response to the fourth trigger pulse applied to gate G4, allowing the current to flow through inductor 85, capacitor 20 and through work coil 15.

The inductors 85 and 86 are so connected in the respective power lines that they form a series resonant circuit with the capacitor 20 when SCR's 81 and 82 should fail to commutate thereby establishing a short circuit during the positive half cycle of the source voltage, or when commutation failure occurs to SCR's 83 and 84 during the negative half cycle of the source voltage.

FIG. 5 is a modification of the circuit of FIG. 4 which is similar thereto with the exception that the inductor 86 serves as the induction heating work coil over which an inductive load, or utensil 90 is placed, and series connected capacitors 87 and 88 are connected across the power lines 18 and 19. The SCR 81 is the first thyristor that is fired during the positive half cycle of the source voltage to charge capacitor 88 which is subsequently discharged through SCR 82 to turn off SCR 81, the SCR 83 being the third to fire to allow capacitor to discharge in the reverse direction to turn off SCR 82. The SCR 84 is then fired to allow current to flow through capacitor 88 and through the now conducting SCR 84, through inductor 85 to capacitor 20.

Figure 6:
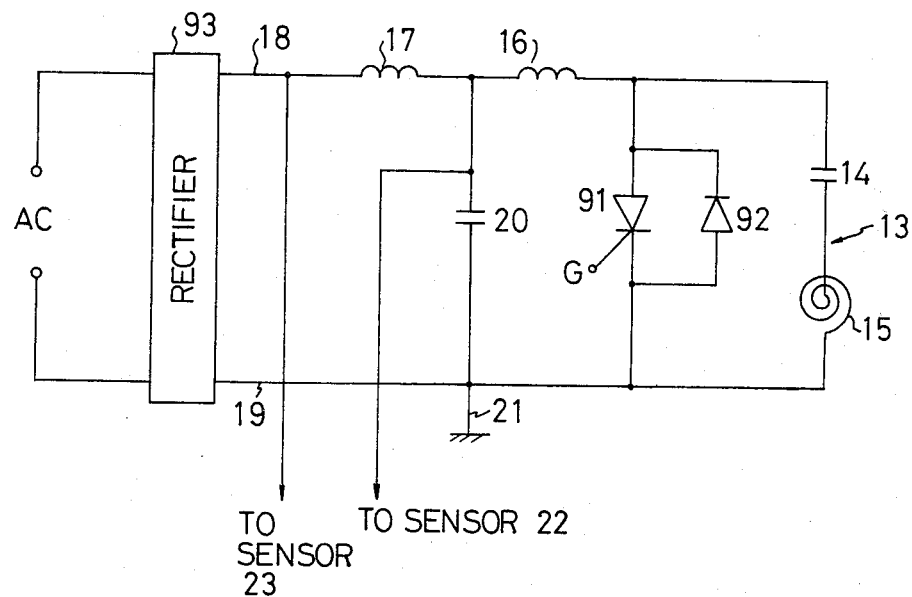
Figure 7:
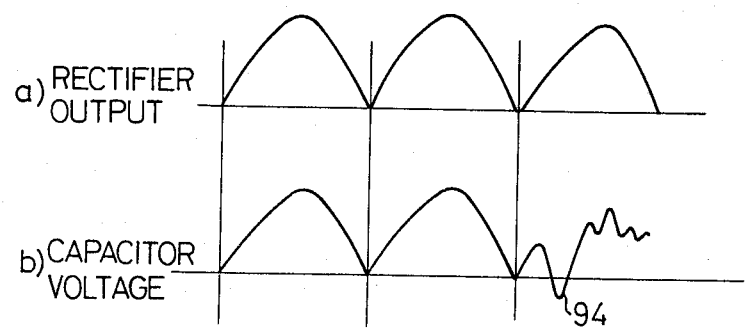
FIG. 7 illustrate typical waveforms associated with the operation of the circuit of FIG. 6.

FIG. 6 is a futher modification of the frequency converter of FIG. 1 in which a single SCR 91 is employed as a trigger element in parallel with a diode 92 which is poled in the opposite direction to the SCR 91 to serve as a commutating path when SCR 91 is turned off. The converter is powered from a full-wave rectifier 93 which is connected to the AC source to provide full-wave rectified unidirectional, sinusoidal half wave pulses, FIG. 7a, to the power line 18 with respect to line 19. When a commutation failure occurs in the SCR 91, the latter establishes a series resonant circuit with capacitor 20 and inductor 16 in the same manner as described above, resulting in a negative voltage 94, FIG. 7b, across the capacitor 20. The voltage sensor 23 is connected to the line 18 detect the unidirectional half-wave pulses.

What is claimed is:

1. A frequency converter comprising:
   a silicon controlled rectifier;
   a first series resonant circuit operatively connected with said silicon controlled rectifier;
   a second series resonant circuit including inductive and capacitive elements operatively connected with said silicon controlled rectifier and tuned to a frequency lower than the resonant frequency of said first resonant circuit and higher than the frequency of a source of energy for generating a reverse voltage across said silicon controlled rectifier upon the occurrence of a commutation failure;
   current supplying means having one terminal connected at one end to said silicon controlled rectifier through said inductive element of said second resonant circuit and another terminal connected to said source of energy
   control means for providing gating signals to said silicon-controlled rectifier to control the flow of current therethrough; and
   means for inhibiting said gating signals upon the occurrence of said reverse voltage to allow said silicon controlled rectifier to restore to its blocking state;
   wherein said inhibiting means comprises means for detecting non-coincidence between the polarities of the energy source and the voltage across said capacitive element of said second resonant circuit, and means responsive to said detected non-coincidence to inhibit said gating signals.

2. A frequency converter as claimed in claim 1, wherein said means for detecting non-coincidence comprises a first voltage sensor connected to said energy source to generate an output having a first and a second voltage level in response to said energy source being above and below zero voltage level and a second voltage sensor connected to said capacitive element of said second resonant circuit to generate an output having a first and a second voltage level in response to the voltage across said capacitive element being above and below zero voltage level, and an Exclusive-OR gate responsive to the outputs of said first and second voltage sensors.

3. A frequency converter comprising:
   a silicon controlled rectifier;
   a first series resonant circuit operatively connected with said silicon controlled rectifier;
   a second series resonant circuit including inductive and capacitive elements operatively connected with said silicon controlled rectifier and tuned to a freuency lower than the resonant frequency of said first resonant circuit and higher than the frequency of a source of energy for generating a reverse voltage across said silicon controlled rectifier upon the occurrence of a commutation failure;
   current supplying means having one terminal connected at one end to said silicon controlled rectifier through said inductive element of said second resonant circuit and another terminal connected to said source of energy;
   control means for providing gating signals to said silicon-controlled rectifier to control the flow of current therethrough;
   means for inhibiting said gating signals upon the occurrence of said reverse voltage to allow said silicon controlled rectifier to restore to its blocking state; and
   means for detecting a zero crosspoint of the voltage of said energy source and means for restoring said inhibiting means upon the detection of said crosspoint.

4. A frequency converter as claimed in claim 1 or claim 3, wherein said inhibiting means comprises means responsive to the presence of said non-coincidence to assume a first binary state and responsive to the absence of said non-coincidence to assume a second binary state.

5. A method of protecting a frequency converter in the event of a commutation failure wherein said converter includes a high frequency series resonant circuit connected in parallel with a silicon controlled rectifier, current supplying means connected between said series resonant circuit and a source of low frequency energy, and control means for providing gating signals to said silicon controlled rectifier, said method comprising:
  generating a reverse voltage across said silicon controlled rectifier in response to said commutation failure;
  inhibiting said gating signals in response to said reverse voltage to thereby allow said silicon controlled rectifier to restore to its blocking state;
  detecting a zero crosspoint of said low frequency energy; and
  restoring current flow through said silicon controlled rectifier upon the detection of a zero crosspoint.

6. A method of protecting a frequency converter in the event of a commutation failure wherein said converter inclues a high freuency series resonant circuit connected in parallel with a silicon controlled rectifier, current supplying means connected between said series resonant circuit and a source of low frequency energy, and control means for providing gating signals to said silicon controlled rectifier, said method comprising:
  generating a reverse voltage across said silicon controlled rectifier in response to said commutation failure including forming a second series resonant circuit in parallel with said silicon controlled rectifier, said second resonant circuit being tuned to a frequency lower than the first-mentioned series resonant circuit and higher than the frequency of said energy source; and
  inhibiting said gating signals in response to said reverse voltage to thereby allow said silicon controlled rectifier to restore to its blocking state.

7. A method as claimed in claim 6, wherein the step of inhibiting gating signals comprises:
  sensing the polarity of said energy source;
  sensing the polarity of the voltage developed in said second series resonant circuit; and
  detecting non-coincidence between the polarities of said energy source and said voltage.

* * * * *